(12) United States Patent
Chopra et al.

(10) Patent No.: US 8,996,409 B2
(45) Date of Patent: Mar. 31, 2015

(54) MANAGEMENT OF ONLINE TRADING SERVICES USING MEDIATED COMMUNICATIONS

(75) Inventors: Vivek Chopra, Fremont, CA (US); David Gaxiola, San Jose, CA (US); Nicholas Szeto, Dublin, CA (US); Hirotoshi Maegawa, Tokyo (JP); Shin Iima, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 417 days.

(21) Appl. No.: 12/690,048

(22) Filed: Jan. 19, 2010

(65) Prior Publication Data

US 2011/0119151 A1   May 19, 2011

Related U.S. Application Data

(60) Provisional application No. 61/261,691, filed on Nov. 16, 2009, provisional application No. 61/261,652, filed on Nov. 16, 2009.

(51) Int. Cl.
G06Q 30/00 (2012.01)
G06F 21/12 (2013.01)
G06Q 30/06 (2012.01)

(52) U.S. Cl.
CPC ............ *G06F 21/12* (2013.01); *G06Q 2220/10* (2013.01); *G06Q 30/0619* (2013.01); *G06Q 30/0603* (2013.01); *G06Q 30/0607* (2013.01)
USPC ......... 705/26.1; 705/26.41; 705/51; 715/706; 725/86; 463/1

(58) Field of Classification Search
CPC ............. G06F 21/12; G06Q 30/0601–30/0631
USPC ............... 705/14.4–14.73, 26.1–27.2, 51–59; 463/1–47; 902/23; 715/706; 725/86–153
See application file for complete search history.

(56) References Cited

U.S. PATENT DOCUMENTS

| 3,409,877 A | 11/1968 | Alterman et al. |
| 3,436,734 A | 4/1969 | Pomerene et al. |

(Continued)

FOREIGN PATENT DOCUMENTS

| CN | 1177808 | 4/1998 |
| CN | 1653443 | 8/2008 |

(Continued)

OTHER PUBLICATIONS

"Online 'Warcraft' 'WOW' Game Grips Millions in U.S., Abroad". San Jose Mercury News ( SJ )—Tuesday, Nov. 15, 2005. By: Graham Toben and John Runkel, Read This! Writers Edition: Morning Final Section: Read This p. 6E.*

(Continued)

*Primary Examiner* — William Allen
(74) *Attorney, Agent, or Firm* — Carr & Ferrell LLP (57) ABSTRACT

Systems and methods for mediation of online trading services are provided. Supplemental content related to a content title may be listed in a market or store for content. A client device sends a mediated communication to a trading server; the mediated communication may include mediation data and a request concerning the transfer of supplemental content. A user account associated with the client device is identified and the supplemental content may then be assigned to the user account. A report regarding activity associated with the assignment of the supplemental content may be generated in accordance with mediation data.

25 Claims, 2 Drawing Sheets

(56) References Cited

U.S. PATENT DOCUMENTS

| | | | |
|---|---|---|---|
| 3,517,171 A | 6/1970 | Avizienis |
| 3,517,174 A | 6/1970 | Ossfeldt |
| 3,623,014 A | 11/1971 | Doelz et al. |
| 3,668,644 A | 6/1972 | Looschen |
| 4,485,457 A | 11/1984 | Balaska et al. |
| 4,587,640 A | 5/1986 | Saitoh |
| 4,752,068 A | 6/1988 | Endo |
| 4,858,930 A | 8/1989 | Sato |
| 5,014,982 A | 5/1991 | Okada et al. |
| 5,128,863 A | 7/1992 | Nakamura et al. |
| 5,222,134 A | 6/1993 | Waite et al. |
| 5,233,423 A | 8/1993 | Jernigan et al. |
| 5,273,294 A | 12/1993 | Amanai |
| 5,291,600 A | 3/1994 | Lutz et al. |
| 5,477,492 A | 12/1995 | Ohsaki et al. |
| 5,490,216 A | 2/1996 | Richardson, III |
| 5,523,551 A | 6/1996 | Scott |
| 5,532,735 A | 7/1996 | Blahut et al. |
| 5,636,277 A | 6/1997 | Nagahama |
| 5,729,214 A | 3/1998 | Moore |
| 5,794,217 A | 8/1998 | Allen |
| 5,809,145 A | 9/1998 | Slik et al. |
| 5,829,047 A | 10/1998 | Jacks et al. |
| 5,838,314 A | 11/1998 | Neel et al. |
| 5,892,900 A | 4/1999 | Ginter et al. |
| 5,913,040 A | 6/1999 | Rakavy et al. |
| 5,971,856 A | 10/1999 | Aoyama et al. |
| 6,066,182 A | 5/2000 | Wilde et al. |
| 6,070,141 A | 5/2000 | Houvener et al. |
| 6,073,123 A | 6/2000 | Staley |
| 6,081,785 A | 6/2000 | Oshima et al. |
| 6,085,262 A | 7/2000 | Sawada |
| 6,117,011 A | 9/2000 | Lvov |
| 6,119,108 A | 9/2000 | Holmes et al. |
| 6,135,646 A | 10/2000 | Kahn et al. |
| 6,137,480 A | 10/2000 | Shintani |
| 6,148,335 A | 11/2000 | Haggard et al. |
| 6,189,146 B1 | 2/2001 | Misra et al. |
| 6,195,432 B1 | 2/2001 | Takahashi et al. |
| 6,201,771 B1 | 3/2001 | Otsuka et al. |
| 6,243,796 B1 | 6/2001 | Otsuka |
| 6,247,131 B1 | 6/2001 | Kotani et al. |
| 6,260,141 B1 | 7/2001 | Park |
| 6,311,209 B1 | 10/2001 | Olson et al. |
| 6,314,451 B1 | 11/2001 | Landsman et al. |
| 6,405,203 B1 | 6/2002 | Collart |
| 6,434,535 B1 | 8/2002 | Kupka et al. |
| 6,446,260 B1 | 9/2002 | Wilde et al. |
| 6,463,078 B1 | 10/2002 | Engstrom et al. |
| 6,470,085 B1 | 10/2002 | Uranaka et al. |
| 6,499,024 B1 | 12/2002 | Stier et al. |
| 6,529,453 B1 | 3/2003 | Otsuka et al. |
| 6,560,640 B2 | 5/2003 | Smethers |
| 6,571,211 B1 | 5/2003 | Dwyer et al. |
| 6,594,740 B1 | 7/2003 | Fukuda |
| 6,611,607 B1 | 8/2003 | Davis et al. |
| 6,640,306 B1 | 10/2003 | Tone et al. |
| 6,694,025 B1 | 2/2004 | Epstein et al. |
| 6,731,940 B1 | 5/2004 | Nagendran |
| 6,811,490 B2 | 11/2004 | Rubin |
| 6,832,318 B1 | 12/2004 | Yaegashi et al. |
| 6,920,565 B2 | 7/2005 | Isaacson et al. |
| 7,043,433 B2 | 5/2006 | Hejna, Jr. |
| 7,071,914 B1 | 7/2006 | Marks |
| 7,076,445 B1 | 7/2006 | Cartwright |
| 7,216,156 B2 | 5/2007 | Chatani |
| 7,228,342 B2 | 6/2007 | Chatani |
| 7,249,139 B2 | 7/2007 | Chuah et al. |
| 7,263,462 B2 | 8/2007 | Funge et al. |
| 7,296,007 B1 | 11/2007 | Funge et al. |
| 7,313,251 B2 | 12/2007 | Rhoads |
| 7,363,384 B2 | 4/2008 | Chatani et al. |
| 7,363,443 B2 | 4/2008 | Rubin |
| 7,425,903 B2 | 9/2008 | Boss et al. |
| 7,426,750 B2 | 9/2008 | Cooper et al. |
| 7,440,431 B2 | 10/2008 | Sindhushayana et al. |
| 7,466,241 B2 | 12/2008 | Lyle et al. |
| 7,495,631 B2 | 2/2009 | Bhakta et al. |
| 7,539,737 B2 | 5/2009 | Chatani |
| 7,558,698 B2 | 7/2009 | Funge et al. |
| 7,636,645 B1 | 12/2009 | Yen et al. |
| 7,636,697 B1 | 12/2009 | Dobson et al. |
| 7,636,701 B2 | 12/2009 | Funge et al. |
| 7,703,611 B1 | 4/2010 | Appelman et al. |
| 8,112,407 B2 | 2/2012 | Jung et al. |
| 8,126,867 B2 | 2/2012 | Jung et al. |
| 8,290,604 B2 | 10/2012 | Capio |
| 8,447,421 B2 | 5/2013 | Capio |
| 8,484,219 B2 | 7/2013 | Weising |
| 2001/0016516 A1* | 8/2001 | Takatsuka et al. ............ 463/31 |
| 2001/0020295 A1 | 9/2001 | Satoh |
| 2001/0025256 A1 | 9/2001 | Oliphant et al. |
| 2001/0034721 A1 | 10/2001 | Boudreau et al. |
| 2001/0042021 A1 | 11/2001 | Matsuo et al. |
| 2001/0051996 A1 | 12/2001 | Cooper et al. |
| 2002/0016922 A1 | 2/2002 | Richards et al. |
| 2002/0041692 A1 | 4/2002 | Seto et al. |
| 2002/0052816 A1 | 5/2002 | Clenaghan et al. |
| 2002/0077988 A1 | 6/2002 | Sasaki et al. |
| 2002/0082997 A1 | 6/2002 | Kobata et al. |
| 2002/0103777 A1 | 8/2002 | Zhang |
| 2002/0103855 A1 | 8/2002 | Chatani |
| 2002/0104019 A1 | 8/2002 | Chatani et al. |
| 2002/0116206 A1 | 8/2002 | Chatani |
| 2002/0116283 A1 | 8/2002 | Chatani |
| 2002/0129094 A1 | 9/2002 | Reisman |
| 2002/0142845 A1 | 10/2002 | Whitten et al. |
| 2002/0161709 A1 | 10/2002 | Floyd et al. |
| 2003/0014423 A1 | 1/2003 | Chuah et al. |
| 2003/0032486 A1 | 2/2003 | Elliott |
| 2003/0114227 A1 | 6/2003 | Rubin |
| 2004/0172323 A1* | 9/2004 | Stamm ............ 705/10 |
| 2004/0264707 A1 | 12/2004 | Yang et al. |
| 2005/0071328 A1 | 3/2005 | Lawrence |
| 2005/0090315 A1 | 4/2005 | Pehr Rubin |
| 2005/0270931 A1 | 12/2005 | Chatani |
| 2006/0002369 A1* | 1/2006 | Dowker ............ 370/351 |
| 2006/0069752 A1 | 3/2006 | Chatani |
| 2006/0264259 A1 | 11/2006 | Zalewski et al. |
| 2007/0015558 A1 | 1/2007 | Zalewski et al. |
| 2007/0015559 A1 | 1/2007 | Zalewski et al. |
| 2007/0021208 A1 | 1/2007 | Mao et al. |
| 2007/0072676 A1 | 3/2007 | Baluja |
| 2007/0082706 A1 | 4/2007 | Campbell et al. |
| 2007/0168359 A1 | 7/2007 | Jacob et al. |
| 2007/0168462 A1 | 7/2007 | Grossberg et al. |
| 2007/0239637 A1 | 10/2007 | Paek et al. |
| 2007/0243930 A1 | 10/2007 | Zalewski et al. |
| 2007/0244751 A1 | 10/2007 | Zalewski et al. |
| 2007/0255630 A1 | 11/2007 | Zalewski et al. |
| 2007/0261077 A1 | 11/2007 | Zalewski et al. |
| 2008/0015878 A1 | 1/2008 | Feng et al. |
| 2008/0024722 A1 | 1/2008 | Pollard |
| 2008/0040767 A1* | 2/2008 | McCarthy et al. ............ 725/132 |
| 2008/0091512 A1 | 4/2008 | Marci et al. |
| 2008/0096668 A1* | 4/2008 | Yoshioka ............ 463/42 |
| 2008/0098448 A1 | 4/2008 | Mondesir et al. |
| 2008/0189170 A1 | 8/2008 | Ramachandra |
| 2008/0220876 A1* | 9/2008 | Mehta et al. ............ 463/42 |
| 2008/0253740 A1 | 10/2008 | Rhoads |
| 2008/0261702 A1 | 10/2008 | Rubin |
| 2009/0112810 A1 | 4/2009 | Jung et al. |
| 2009/0112914 A1 | 4/2009 | Jung et al. |
| 2009/0119188 A1* | 5/2009 | Pagan ............ 705/27 |
| 2009/0221368 A1 | 9/2009 | Yen et al. |
| 2009/0221374 A1 | 9/2009 | Yen et al. |
| 2009/0265075 A1* | 10/2009 | Ourega ............ 726/28 |
| 2009/0288064 A1 | 11/2009 | Yen et al. |
| 2009/0327099 A1* | 12/2009 | Patel et al. ............ 705/27 |
| 2010/0004896 A1 | 1/2010 | Yen et al. |
| 2010/0048300 A1 | 2/2010 | Capio |
| 2010/0049344 A1 | 2/2010 | Capio |
| 2010/0121729 A1* | 5/2010 | Betzler et al. ............ 705/26 |
| 2010/0262924 A1 | 10/2010 | Kalu |

(56) References Cited

U.S. PATENT DOCUMENTS

| | | |
|---|---|---|
| 2011/0035265 A1 | 2/2011 | King et al. |
| 2012/0072424 A1 | 3/2012 | Weising |
| 2014/0152461 A1 | 6/2014 | Carlson et al. |

FOREIGN PATENT DOCUMENTS

| | | |
|---|---|---|
| CN | ZL02808575.2 | 9/2008 |
| CN | 101533499 | 9/2009 |
| EP | 0454340 | 10/1991 |
| EP | 0773490 A1 | 5/1997 |
| EP | 0795809 | 9/1997 |
| EP | 1016960 A1 | 7/2000 |
| EP | 1362295 | 11/2003 |
| EP | 1444022 | 8/2004 |
| EP | 2330550 | 6/2011 |
| JP | H04-253885 | 9/1992 |
| JP | H06-180674 | 6/1994 |
| JP | H09-244886 | 9/1997 |
| JP | H10-069511 | 3/1998 |
| JP | H10-133955 | 5/1998 |
| JP | H10-222428 | 8/1998 |
| JP | H11-143719 | 5/1999 |
| JP | 2000-020795 | 1/2000 |
| JP | 2000-227919 | 8/2000 |
| JP | 2000-298689 | 10/2000 |
| JP | 2001-169246 | 6/2001 |
| JP | 2001-340656 | 12/2001 |
| JP | 2004-524612 | 8/2004 |
| JP | 2004-526240 | 8/2004 |
| JP | 2005-505358 | 2/2005 |
| JP | 2007-293901 | 11/2007 |
| JP | 2008-104502 | 5/2008 |
| JP | 2009-500127 | 1/2009 |
| JP | 2009-213736 | 9/2009 |
| JP | 2010-255985 | 11/2010 |
| JP | 2011-001082 | 1/2011 |
| JP | 2013-002964 | 1/2013 |
| JP | 5395037 | 10/2013 |
| KR | 1998-030143 | 7/1998 |
| KR | 1998-033266 | 7/1998 |
| KR | 2000-0060715 | 10/2000 |
| KR | 10-2005-0034586 | 4/2003 |
| kR | 2003-0087004 | 11/2003 |
| KR | 10-2005-6243500 | 3/2006 |
| KR | 10-2009-0001479 | 1/2009 |
| WO | 0016229 | 3/2000 |
| WO | 0063860 | 10/2000 |
| WO | 0201333 | 1/2002 |
| WO | 02067093 | 8/2002 |
| WO | 03031004 | 4/2003 |
| WO | 2007008713 | 1/2007 |
| WO | 2012039849 | 3/2012 |

OTHER PUBLICATIONS

"Average gameplay". Bruno Dieter Chan. New Straits Times. Kuala Lumpur: Apr. 7, 2008. p. 20.*
"Warcraft creates amazing online world". Bill Hutchens. The News Tribune. Tacoma, Wash.: Jan. 14, 2005. p. G.19.*
Mueller et al., "A Nested Transaction Mechanisum for LOCUS," Proceedings of the Ninth ACM Symposium on Operating System Principles (1983).
International Search Report for PCT/US02/05141 mailed Aug. 19, 2002.
Supp. European Search Report for EP1362295 mailed Dec. 6, 2006.
Communication from the Examining Division for EP 02713641.5 mailed Aug. 27, 2009.
Application deemed withdrawn (no reply to communication from Examining Division).
109/110 Communication from the Examining Division regarding possible amendment of claims for EP 02713641.5 mailed Aug. 27, 2009.
International Search Report for PCT/US02/32439 mailed Apr. 17, 2003.
International Preliminary Examination Report for PCT/US02/32439 mailed Apr. 10, 2004.
Supp. European Search Report for EP02769044 mailed Dec. 9, 2004.
109/110 Communication from the Examining Division regarding possible amendment of claims for EP 02769044 mailed May 25, 2004.
Communication from the Examining Division for EP 02769044 mailed May 13, 2005.
Communication from the Examining Division for EP 02769044 mailed Apr. 10, 2006.
Invitation to declare maintenance of the application and to correct deficiencies in the Written Opinion/Amend Application for EP 02769044 mailed Dec. 23, 2004.
Decision to Refuse the Application from the Examining Division for EP 02769044 mailed Feb. 9, 2009.
International Search Report for PCT/US11/47132 mailed Dec. 15, 2011.
Extended European Search Report for EP10007804 mailed Jan. 21, 2011.
Communication from the Examining Division for EP 10007804.7 mailed Jul. 30, 2012.
Summons to attend oral proceedings for EP 10007804.7 mailed Mar. 15, 2013.
Decision to Refuse the Application from the Examining Division for EP 10007804.7 mailed May 23, 2013.
Statement in accordance with the Notice from the European Patent Office dated Oct. 1, 2007 concerning business methods (OJ Nov. 2007; p572f).
IMB DOS 3.3 Ref. Card (1987).
JP 06-180674 translation.
Oni Game Manual [online], released Jan. 2001 [retreived on Feb. 25, 2009]. <URL: http://replacementdocs.com>.
First Rejection in CN application 02808575.2 mailed Jul. 28, 2006.
Second Rejection in CN application 02808575.2 mailed Aug. 3, 2007.
Notice of Allowance in CN application 02808575.2 mailed May 16, 2008.
Rejection in KR 10-2004-7005102 mailed Oct. 25, 2005.
Rejection in JP 2010-255985 mailed Nov. 20, 2012.
Questioning in JP 2010-255985 mailed May 28, 2013.
Notice of Allowance in JP 2010-255985 mailed Oct. 15, 2013.

* cited by examiner

MANAGEMENT OF ONLINE TRADING SERVICES USING MEDIATED COMMUNICATIONS

CROSS-REFERENCE TO RELATED APPLICATIONS

The present application claims the priority benefit of U.S. provisional application No. 61/261,691 filed Nov. 16, 2009 and U.S. provisional application No. 61/261,652 filed Nov. 16, 2009. The present application is related to U.S. patent application Ser. No. 11/759,155 filed Jun. 6, 2007 and entitled "Cached Content Consistency Management"; U.S. patent application Ser. No. 11/759,143 filed Jun. 6, 2007 and entitled "Mediation for Auxiliary Content in an Interactive Environment"; and U.S. patent application Ser. No. 12/690,051 filed concurrently herewith and entitled "Mediation of Content-Related Services." The disclosures of each of these applications are incorporated herein by reference.

BACKGROUND OF THE INVENTION

1. Field of the Invention

The present invention generally relates to mediation of services. More specifically, the present invention relates to mediation of online trading services.

2. Background of the Related Art

Digital content encompasses a range of audio, video, video games, and software applications. Such content is typically sold or transferred via download over a communications network or on some form of digital storage media including optical discs such as a compact disc (CD) or digital versatile disc (DVD). Content may also be sold or transferred via the likes of non volatile memory such as flash memory. Content titles may refer to particular movies, television shows, and video games.

Digital content may be played on computing devices, media players, and/or game consoles. Because such devices may have access to a communication network such as the Internet, various services associated with the digital content may be provided via the communication network to update, upgrade, or otherwise supplement the content following the original sale or transfer of the content. Such services may include supplemental content, ancillary content, customization of content, as well as the option to upgrade certain content.

Certain content providers do not have the resources, rights, or expertise to supplement various forms of content. Other content providers may not wish to focus their energies and resources on supplementing content following its release, but still offer the opportunity for supplementing that content. In order to enhance the enjoyment, utility, and corresponding desirability of their content—or the content of others—content providers may allow for supplemental services to be provided by third-party service providers.

Supplemental services may include the trading of supplemental content related to content titles. Supplemental content may include digital objects used in one or more game titles and that have actual or intrinsic value to game players. As a game developer may not wish to directly provide such content, third parties may be allowed to host markets where such supplemental content can be purchased, traded, and managed.

The need of service providers for statistical, accounting, and bookkeeping information related to user activity that relates to an online trading service is as critical as it is complicated. There is a need in the art for mediation of online trading services provided by third-party service providers.

SUMMARY OF THE INVENTION

Embodiments of the invention provide mediation of online trading services. Supplemental content related to a content title may be listed in a market or store for content. A user of a client device may send a mediated communication to a trading server. The mediated communication may include mediation data and a request concerning transfer of supplemental content. The user account is identified, and the supplemental content may then be assigned to the user account. A report regarding activity associated with the assignment of the supplemental content may be generated in accordance with mediation data.

Various embodiments of the present invention may include methods for mediation of online trading services. Such methods may include receiving a mediated communication sent from a client device to a trading server. Such a mediated communication may include mediation data and a request concerning a transfer of supplemental content related to a content title played on the client device. A method may further include identifying a user account associated with the mediated request, assigning the supplemental content to the user account associated with the client device, and sending a report from the trading server to a mediation server regarding activity associated with the assignment of the supplemental content in accordance with the mediation data.

Further embodiments may include systems for mediation of online trading services. Such systems may include a marketplace server configured to host a store of supplemental content related to a content title played on a client device and a trading server configured to receive a mediated communication that includes mediation data and a request concerning a transfer of supplemental content, to identify a user account associated with the mediated request, and to assign the supplemental content from the marketplace server to the user account associated with the client device. A system may further include a mediation server configured to mediate communication from or to the client device.

In yet another embodiment of the present invention, computer-readable storage media is provided. Embodied on such computer-readable storage media may be a program that is executable by a processor to perform a method for mediation of online trading services.

DETAILED DESCRIPTION

Figure 1:
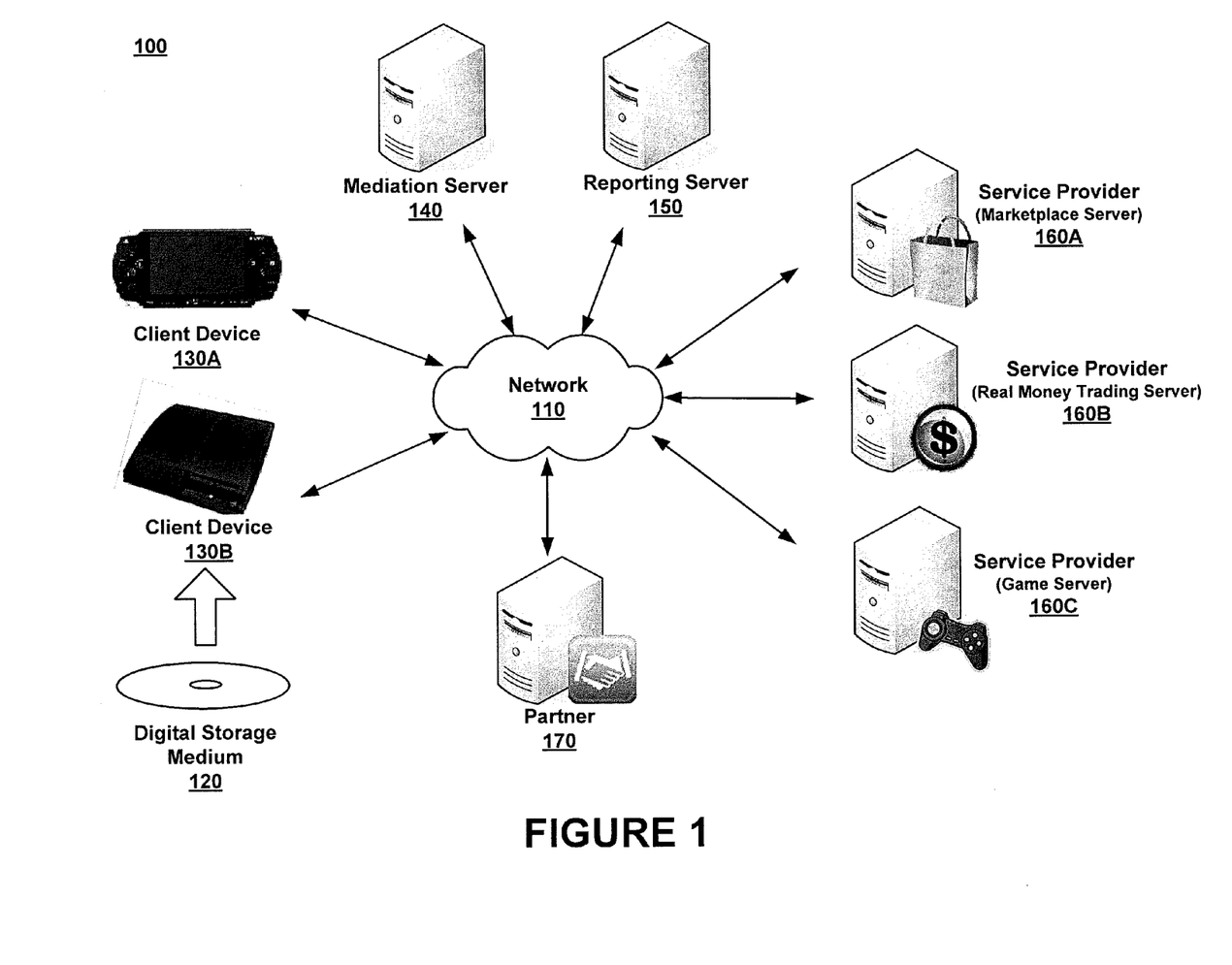
FIG. 1 illustrates an exemplary server-client environment in which a system for mediation of online trading services may be implemented.

FIG. 1 illustrates a server-client environment for content-related mediation 100. In environment 100, one or more client devices 130A and 130B are in communication with other computing devices via communication network 110. Client devices 130A-B are capable of playing content such as content embodied on digital storage medium 120 or that might be downloaded from a content provider over network 110. Environment 100 as illustrated in FIG. 1 also includes a mediation server 140, reporting server 150, various service providers (e.g., marketplace server 160A, trading server 160B, and game server 160C), and partner server 170.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of server-client environment 100.

The digital storage medium 120 of FIG. 1 may include a media storage device such as a CD or DVD. Digital media include information and content that may be accessed on the digital storage medium 120 and executed or 'played' on client device 130 such as a file of content. Digital media may include portions of data or locked or 'secure' data whereby further information and/or interaction with a game server 160C or other service provider 160 may be required in order to unlock, access, play, or otherwise use that data.

In some instances, the further information or the content itself may be downloaded over communications network 110. In such an instance, the further information or the downloaded content may be stored in memory at the client device 130 or in some other form of storage device accessible to the client device 130. The content, whether downloaded or accessed from digital storage medium 120, may further include metadata or other information to characterize or classify one content selection from another content selection.

In some instances, the content maintained at client device 130 or on the digital storage medium 120 or accessed over communications network 110 may be further associated with certain supplemental data or services such as those developed in conjunction with a service software development kit (SDK). Service providers 160 may use the service SDK to integrate their specific services with a particular content title or selection. Initializing a service SDK may require a determination that a particular service is available to users or players of the content on the client device 130. For example, certain content such as a particular game title may be associated with service from particular service provider(s) 160. A particular service provider 160 may specialize, be licensed, or otherwise technically able to provide a specific service related to the game title. Based on a determination as to the availability of a content-related service and/or a service provider 160 of such a service, a request for service mediation with respect to the content-related service may be sent from the client device 130 to the mediation server 140.

Client device 130 may be one of any number of different electronic client or end-user devices such as an electronic gaming system, a general-purpose computer, a set-top box, a Blu-Ray® player, or a portable gaming device that may access the content stored on the digital storage medium 120. Client device 130 may be a home entertainment device such as a PlayStation® 3 from Sony Computer Entertainment Inc. as well as any one of a number of portable media devices such as a PlayStation Portable (PSP®), including the PSP® Go system, also from Sony Computer Entertainment Inc. Client device 130 may also be a home media center capable of playing or executing DVDs or CDs as well as other optical, flash, or on-demand media, which may audio-only content in addition to full-motion video and still-frame content. Client device 130 may also include a mobile device such as a cellular phone, a personal digital assistant (PDA), as well as a Netbook (i.e., a miniature laptop computing device).

Client device 130 may be configured to access data from other storage media such as memory cards or disk drives as may be appropriate in the case of downloaded content. A client device 130 is likewise inclusive of any device capable of receiving primary and/or ancillary content over a network or through some other communications operation such as a synchronization operation with another computing device via an ad hoc communications network, storing that content locally at the client device 130 or at a storage device coupled to the client device 130, and exchanging data with a server configured for such exchanges. This may include exchanges with mediation server 140, reporting server 150, and/or server(s) associated with service provider 160 or partner 170.

Each client device 130 may be associated with a unique device identifier. During a use of the client device 130, a user may register (either manually or through an automatic exchange of data over network 110) the client device 130 (and device identifier) with a database or server. The client device 130 may be registered and identified thereafter by reference to the device identifier, a corresponding user identifier, or both. The server may store a device identifier, a corresponding user identifier (or identifiers), or both. Client device 130 includes standard computing components such as network and media interfaces, computer-readable storage (memory), and processors for executing instructions that may be stored in memory.

A server like mediation server 140, reporting server 150, and server(s) associated with service provider 160 or partner 170 may be any computing device as is known in the art, including standard computing components such as network and media interfaces, computer-readable storage (memory), and processors for executing instructions that may be stored in memory. The functionalities of multiple servers may be integrated into a single server. Any of the aforementioned servers (or an integrated server) may take on certain client-side, cache, or proxy server characteristics. These characteristics may depend on the particular network placement of the server, or certain configurations of the server.

Requests for mediation of content-related services provided by service providers (e.g., service provider 160) may be sent to a mediation server 140. Such requests for mediation may include "tokens" or other data reflective of certain information, including information about the client device 130 and about service provider 160. This information may include a device identifier, geographic region of the device, type of service, service provider identifier, and particular configuration information related to the device and/or service provider. The aforementioned "tokens" or information included as a part of a mediation request may further include information related to user(s) of the client device 130 such as a user identifier, network address, and geographic location as well as information related to the content being executed or 'played' on client device 130 and as may be indicated through a game title or other title identifier. The "token" may further concern information related to a requested service or designated service provider 160 as may occur through a service identifier.

Tokens may be updated as the information associated with the token is updated as tokens may be dynamic. Based on the information provided in a mediation request, the mediation server 140 may authenticate the user and/or the client device 130. The data received from a client device 130 may also be cryptographically signed to verify the identity of client device 130, identity of a user of the client device 130, and/or integrity of the data related to the mediation request. The information provided as a part of a mediation request and a corresponding token may also be used by the mediation server 140 to determine a set of permissions and provide the set of permissions and, if required, configuration information for the client device 130. Based on the set of permissions and/or provisioning of configuration, the client device 130 may access the requested service to be provided in accordance with the corresponding set of permissions.

The set of permissions determined for client device 130 may be based on market segment information indicated by information included in the mediation request. A market segment may refer to geographic location, region, type of client device 130, user information, and various combinations of the foregoing. For example, a particular service option may be only available to users—more specifically, the client devices 130 of those users—in a particular geographic location.

Alternatively, there may be multiple service providers 160 for the requested service, or a service provider 160 may be associated with multiple distributors. In such an instance, a service provider 160 may be requested or assigned to the client device 130 based on, at least, the market segment information, which may include, for example, geographic location. Other factors determining availability of services provided by a service provider 160 may also apply. For example, a service may only be available on certain client devices 130 of a particular brand, model, or require presence of peripheral devices, or require users to certify that they are a certain age.

In some instances, the mediation request indicates a present configuration of the client device 130. Mediation server 140 may use such information to determine what configuration information needs to be generated to permit mediated communication between the client device 130 and an identified service provider 160 of the requested service. In some instances, configuration information may be pre-generated and selected based on the determined permissions. Configuration information may thus be selected from a catalog rather than generated for each requesting client. Default configurations may exist and be associated with certain market segments. As such, mediation server 140 may be able to simply designate an existing configuration to send to client device 130 based on the market segment information.

Mediation server 140 may also send the configuration information to the client device 130. Such configuration information may apply the set of permissions to an identified service provider 160, including mediated communications with the identified service provider 160, how the requested service is provided, and associated service option(s). Configuration of the client device 130 according to the configuration information allows for mediated communication to commence between the client device 130 and service provider 160. More specifically, implementation of the configuration information may allow for the requested service to be provided to the client device 130 in accordance with the corresponding set of permissions.

In addition to allowing for the client device 130 to receive the service from the service provider 160, the set of permissions may also determine what information is tracked and provided to reporting server 150 with respect to activity associated with the service. For example, a service may include providing ancillary content such as advertising for display in a particular game or movie title to a user of the client device 130. Such ancillary content may be specifically associated with particular primary content or title.

Activity involving the ancillary content, such as user-generated data concerning events or interactions with the ancillary content, or other service activity results such as successful delivery and introduction of ancillary content into a game title), may be tracked and delivered to reporting server 150. Reporting of this information may be based on the set of permissions embodied in the configuration information and determined by the mediation server 140. For example, the set of permissions may indicate parameters for tracking and evaluating advertising impressions whereby a game character must be within a certain distance or interact with an advertisement for an impression to count. A client device 130 may track such information and generate various reports in accordance with the set of permissions. Such reports may then be sent to reporting server 150. Alternatively, a service provider 160 may be dedicated to monitoring a particular game title, and mediation allows for service provider 160 to monitor events and activity related to the game title on client device 130.

The set of permissions may further specify reporting parameters regarding sampling and aggregation frequency, which may be in real-time, hourly, daily, weekly, monthly, on-demand, or upon achieving a benchmark. The set of permissions may be further based on various factors including user information or specific aspects as they concern the administrator(s) of the mediation server 140, the service provider(s) 160, and/or partner(s) 170.

A partner 170 may be any entity with a business interest in receiving information regarding a mediated service. For example, a service provided by a service provider 160 may include delivering supplemental content for display in a particular video game environment. The subject of such advertising, however, may be the product(s) or service(s) of a partner 170 that originated the advertising buy for distribution to client devices 130. The partner 170 may therefore also be interested in seeing information concerning such advertising. While a particular service provider 160 may wish to track indicators regarding its own services generally, partner 170 may only be interested in information regarding advertising related to their products and services. Reporting server 150 may also track information regarding services provided by multiple service providers 160 for quality control and verification purposes. Such information may be processed and included in compilations sent to the service providers 160 and partners 170.

In this context, information regarding the user activity, interaction, and/or feedback with a service is collected at client device 130 and reported to reporting server 150 in accordance with the set of permissions. Reporting server 150 receives the information from the client device 130, which can then be used to generate various compilations of information for various parties such as service providers 160 and partners 170. A reporting server 150 may further collect information sent by service providers 160 regarding the services provided and any activity on the side of the service provider 160. Such compilations may include some or all of the information collected, depending on various parameters. For example, a service provider 160 may be specifically interested in information pertaining to a particular game title. The information collected by reporting server 150 may also be used to verify and confirm information regarding transactions between client devices 130 and mediated service providers 160.

The reporting server 150 may encompass or communicate with multiple reporting servers that receive and handle reports from various parties. For example, one particular reporting server may receive reports from client devices, while another server may receive reports from service providers. Each type of server may be further specialized based on the type of device with which they communicate. For example, the set of permissions may specify different reporting parameters based on the type of device. The set of permissions may therefore specify that a client device may send reports in real-time, while a service provider may send bulk or aggregated reports at specified intervals. A reporting server in communication with a client device may require different capabilities than a reporting server in communication with a service provider. Such information in the received reports may be further processed, compared, combined, and analyzed to produce digests, summaries, samples, analyses, and/or other types of compilations for the various parties discussed above. In some embodiments, the compilations may be generated by a separate device, such as a compilation generator.

Services offered by service providers 160 may encompass a variety of services related to content such as digital content 120 played on client device 130. Such services may include services that allow for trading of supplemental content that is related to a particular content title. In an exemplary transaction in environment 100, a user of client device 130A may wish to offer to trade content in exchange for something else—other supplemental content, virtual or real money, or a combination of the foregoing. Trading may encompass sales, swaps, and auctions in addition to other types of transactions.

Where the content title is a game title, the content offered for trade or as part of some other transaction may have been generated by the user for enhancing their gaming experience with respect to a particular game title. For example, a user may be in possession of custom game characters, cars, weapons, accessories, sound effects, or video clips. Alternatively, the user may have found or earned the supplemental content based on performance or actions taken during play of the game title. A user may find certain game objects during the course of gameplay and/or have earned game objects as a prize for an achievement reached during gameplay.

Such supplemental content may be desirable to other players of the game title because this supplemental content may convey status, provide certain options not otherwise available to the user contemplating the trade, provide artistic value, or save time versus creating supplemental content from scratch. The creator or current possessor of such content may therefore wish to sell and/or trade the supplemental content.

Service provider 160A is a marketplace server, which hosts an online marketplace where users can make and/or accept various offers to participate in various transactions. Such a marketplace allows for user of client device 130A, for example, to list supplemental content available for trading. As a result of this listing, a potential buyer such as a user of client device 130B, can browse or search for content offerings. Each listing may be associated with an asking price, which may refer to other supplemental content, virtual money, and/or real money. The virtual money may or may not correspond to real money. While content may be user-generated and offered for trading by a particular user, entities offering supplemental content may also include game developers, content developers, and service providers. Parties listing content for trading may have user accounts stored on, maintained by, or otherwise accessible by the marketplace server 160A. Such user accounts may allow for tracking of such transactions, including the content listed for trading, content that has been traded, virtual money, and real money involved in the transactions.

The marketplace hosted by service provider 160A may be accessible via traditional web-based interfaces such as those offered by commercially available web browsers or through native interfaces as may be generated for in-game interaction. These interfaces may be presented at the various client devices such as client device 130A or 130B and present various potential transactions available to users. In the event that a user wishes to access the marketplace via a web browser, the browser may use a lightweight component or module (e.g., JavaScript or ActiveX) executable in the web browser to support mediation for web-based interfaces. Web-based interfaces may be limited in their ability to offer certain transactions (e.g., in-game transactions) that may be available in native interfaces. Mediation of marketplace services may include enabling or disabling access to the marketplace and/or restrictions on actions in the marketplace. The user may alternatively use a game console with a native client application to access the marketplace.

In addition, communications between the marketplace server (e.g., service provider 160A) and other servers may also require mediation. For example, marketplace server 160A may communicate with trading server 160B with respect to facilitating trades of supplemental content. In some embodiments, the functions of marketplace server 160A and trading server 160B may be performed by a single server. Another example may include mediated communication between the marketplace server 160A and game server 160C with respect to transfers of game data, as sellers list game-related content for sale and buyers obtain game-related content for use in the game hosted by game server 160C.

Listing an item in the marketplace hosted by service provider 160A may require mediation by mediation server 140. As described with respect to FIG. 1, the client device 130A of a seller can send a request for service mediation to mediation server 140 and receive configuration information providing for mediated communication with a service provider 160A to manage the requested service. Mediation may occur by title and/or by transaction.

Once mediated communication between client device 130A and service provider 160A commences, the seller can list content in the marketplace for other users to browse, view, and offer to buy or trade. The "price" of the supplemental content may be expressed in pure or partial monetary terms. For example, the user-creator may be amenable to swapping content. Where the content being swapped is not equal, however, the difference may be made up with virtual and/or real money, as agreed upon by the seller and buyer. Marketplace server 160A may further provide a platform the seller and buyer to communicate and negotiate a trade.

To initiate an agreed-upon trade for supplemental content listed on marketplace server 160A, a user at client device 130B may submit a request to service provider 160B. Service provider 160B is a trading server that facilitates transactions that involve trading supplemental content. Marketplace server 160A and trading server 160B may be affiliated so that user account information may be synchronized. Transactions initiated on marketplace server 160A may then be processed by trading server 160B. Alternatively, a single service provider may provide both the marketplace services and facilitation of transactions.

The services provided by trading server 160B are also mediated via client device request, a determination of a set of permissions, and subsequent configurations that correspond to the set of permissions. In one example involving the trade of supplemental content from a user account associated with client device 130A to a user account associated with client device 130B in exchange for $10, the trading server 160B may reassign the supplemental content from the user account 130A to user account 130B. The agreed upon price of $10 may also be transferred from user account 130B to user account 130A by trading server 160B. Trading server 160B may also provide various security measures to prevent, detect, and handle fraud and other illicit behavior.

In some instances, the trading server 160B may provide or associate (e.g., via a third-party escrow) with escrow services. The trading server 160B may be responsible for managing payment and establishing an escrow account with an escrow service for holding payment and content being traded as well as delivery of the payment and content to the appropriate recipients. Money and the supplemental content may be held in escrow as an intermediate step prior to releasing the funds and property to the respective user accounts.

When trading server 160B has received the seller content and buyer payment for escrow, the service provider 160B may further verify the items being exchanged and then make the transfer. Payment may be transferred into a seller account, while the content is assigned to the buyer. Assigning the content may also include registering the content under the buyer name, transmission of the content to a client device 130B of the buyer, and/or transfer to a buyer account on a game server 160C.

The marketplace server 160A and trading server 160B may also report information regarding such transactions to the reporting server 150. Such reports may include information regarding the transaction, transaction status, time, country of seller/buyer, amount, currency, content being traded, content identifier, content attributes, and association with a particular title. Because reports are sent to reporting server 150 from both the client device-side and the service provider-side, the reporting server 150 may be able to perform double-entry bookkeeping as well as various verification and quality control functions.

Service provider 160C is a game server that might host an online game environment in which a user may utilize the supplemental content offered in marketplace server 160A and traded using trading server 160B. In instances where the content is associated with a particular game title, the traded content may have been removed from a user account associated with a seller on a game server 160C, where such content is stored and managed, and then sent to a user account associated with a buyer on game server 160C when the transaction is completed. For example, in massive multi-player online role-playing games (MMORPGs), a game server 160C may maintain an inventory for each user and manage rights to the items in inventory. To use supplemental content that has been purchased, the information regarding the supplemental content may have to be synchronized or transferred to game server 160C. As with the service providers 160A and 160B, communication with game server 160C may also be mediated.

Figure 2:
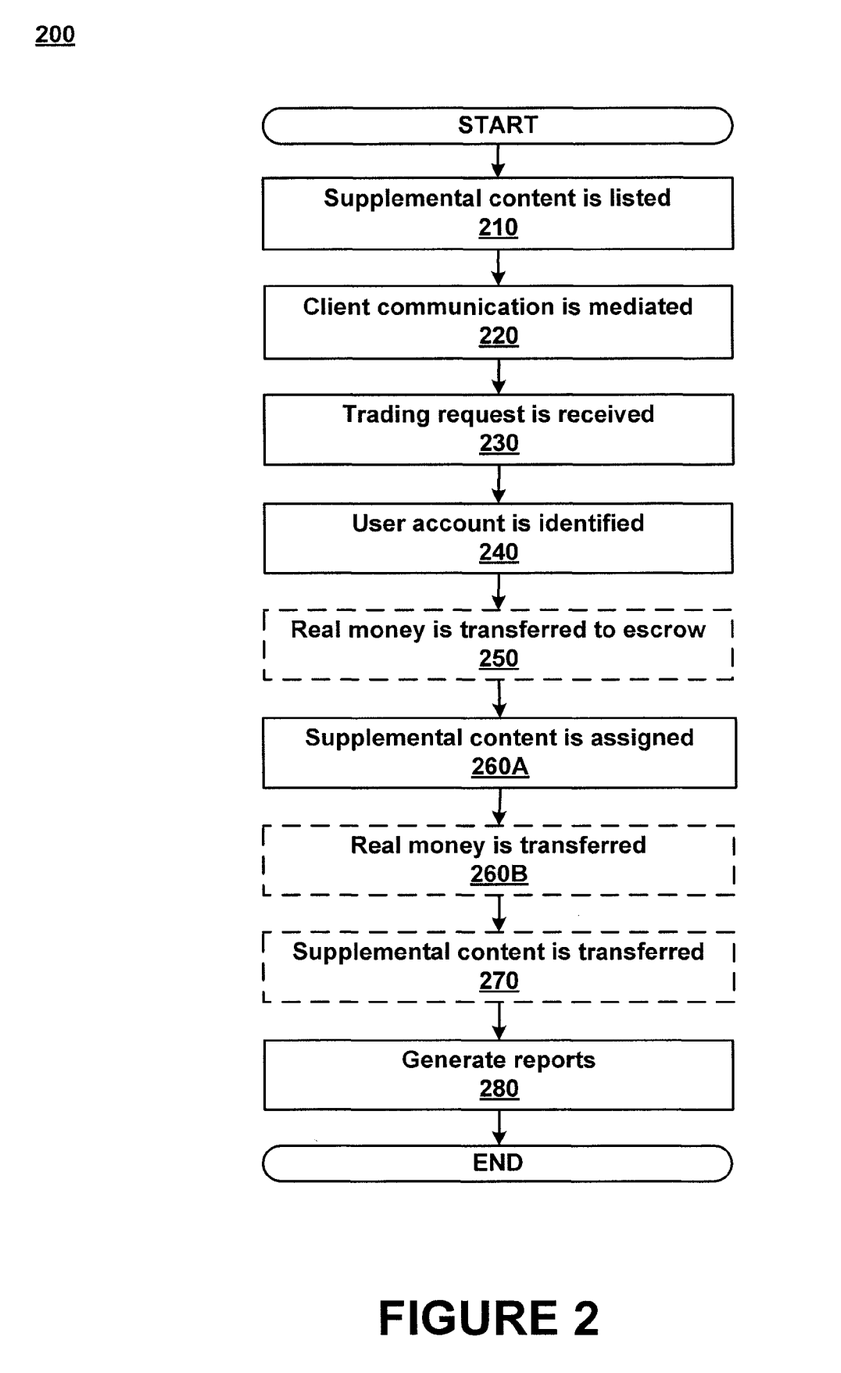
FIG. 2 illustrates an exemplary method for mediation of online trading services.

FIG. 2 illustrates a method 200 for mediation of online trading services. In method 200 as illustrated in FIG. 2, supplemental content is listed in a marketplace, communication between a client device and the marketplace and/or trading servers is mediated, a mediated communication regarding a trade for the supplemental content is received by a trading server, and a user account associated with the communication is identified. In trades involving virtual/real money, the virtual/real money and supplemental content may be held in an escrow account. Once any requisite escrow requirements are satisfied, the virtual/real money is transferred to an account belonging to an entity offering the supplemental content, and the supplemental content is assigned to the requesting user account. The supplemental content may further be transferred to a game server for access and use during gameplay. Reports regarding such activities may be generated and sent to a reporting server.

In step 210, supplemental content is listed in a marketplace. Supplemental content may be user-generated, user-customized, or otherwise found or earned by a user during the course of playing a content title. An example of supplemental content may be a weapon earned or customized in a MMORPG title. Listing an item in a marketplace may include transferring information regarding the weapon from a game server 160C associated with the MMORPG to a marketplace server 160A. The information regarding the content and transfer thereof may be synchronized between the marketplace server 160A and game server 160C. For example, a user account on the game server 160C may encompass or be associated with a user account on marketplace server 160A. An account may be linked among service providers 160A-C through a service SDK.

A user of client device 130A may offer for trade a user-generated weapon that may be used in a particular MMORPG title. Other players of that game title may browse the marketplace hosted by marketplace server 160A. If an individual is interested in obtaining that weapon, that individual may either indicate acceptance of the offer to trade or otherwise negotiate a trade with the entity offering the weapon.

In step 220, communication between client device 130B and trading server 160B is mediated. Initialization of an SDK allows for generation of a request to a mediation server 140. Such a request may include a user identifier, a device identifier, a service identifier, or some other form and/or combination of identifying information. The identifiers may be embodied in a "token," which may further indicate geographic location or region, user age, or title being played. The user or client device 130B may be identified and/or authenticated based on the information in the request. In addition to mediation of communications between client device 130B and trading server 160B, other communications between a client device 130 and service provider 160 may require mediation. For example, mediation may be required for user of client device 130A to communicate with marketplace server 160A, thereby allowing the user to list the supplemental content for trading. Mediation may also be required for client device 130B to access marketplace server 160A for browsing.

Based on the information included in the mediation request, a set of permissions may be determined. The set of permissions may be based on market segment, which may be defined differently among various titles of content that can be played on client device 130B and services associated with such titles. For example, a market segment may refer to geographic region, such that a service provided to users in one region may differ from a corresponding service provided to users in another region. The set of permissions may also designate a certain trading server 160B, distributor of the service provider, network address, and URL. Client device 130B may be allowed to communicate with trading server 160B in accordance with the set of permissions.

In step 230, a mediated request for trading is received by trading server 160B. Once communication between client device 130B and trading server 160B is mediated and allowed to commence, the trading server 160B may receive a mediated communication from client device 130B. A mediated communication may include mediation data such as data concerning the set of permissions, and a request designating supplemental content for trading.

In step 240, a user account is identified. The mediated request from client 130B may further include user information, including identifiers, tokens, and account information that may be used to determine a user account associated with the trade request. In some instances, a new user account may be created and/or associated with user account(s) on marketplace server 160A and game server 160C.

In trades where virtual and/or real money is being transferred, the virtual/real money and supplemental content may be transferred to an escrow account in step 250. For example, the user of client device 130B may have accepted an offer to purchase supplemental content offered by user of client device 130A for $10. The user account associated with client device 130B may be further associated with financial information such as credit card information used to purchase the supplemental content. In some instances, certain parameters may be verified before the money or supplemental content is released from escrow.

In steps 260A and 260B, the exchange of the supplemental content for the virtual/real money occurs. In step 260A, the supplemental content is assigned to a user account associated with the buyer, which may be the user of client device 130B. Assignment of the supplemental content to the buyer may or may not include any actual transfer of content to client device 130B. The ownership information associated with the supplemental content may simply be updated to reflect the transaction and new owner. Account information stored in marketplace server 160A, trading server 160B, and game server 160C may be synchronized again to reflect the updated status of the supplemental content and participants of the trade.

In step 260B, the virtual/real money may be transferred from escrow to an account associated with the entity making the offer of the supplemental content. The entity making the offer may access the funds for use in purchasing other supplemental content available on marketplace server 160A, cashing out, etc.

When the transaction is completed in steps 260A and 260B, the user account of the buyer reflects ownership of the supplemental content (e.g., MMORPG weapon). The buyer may then begin using the weapon in the MMORPG, which is hosted on game server 160C. To do so, however, the information regarding the weapon may have to be moved to game server 160C in step 270. The supplemental content may be transferred from marketplace server 160A or trading server 160B. The user account on game server 160C may reflect the received supplemental content, which may then be available for use during gameplay.

In step 280, reports are generated and sent to reporting server 150. In mediated environment 100, information is sent from client devices such as client device 130A-B and service providers such as service providers 160A-C to reporting server 150. Reporting server 150 may encompass multiple servers that specialize in processing reports from either client devices or service providers. The information received by reporting server(s) 150 may be compared against each other, verified, analyzed, and presented in information compilations. The compilations may be generated for service providers 160 or partners 170 based on parameters specific to the compilation recipient.

The present invention may be implemented in an application that may be operable using a variety of end user devices. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for managing online trading services associated with digital content, the method comprising:

receiving at a trading server a mediated communication sent from a client device, the client device including a memory and a processor for executing instructions stored in the memory, the mediated communication including a request concerning a transfer of supplemental content related to a content title played on the client device and at least one token, the at least one token including configuration information about the client device, in which the mediated communication and the token are used by a mediation server to determine and provide a set of permissions, in which the set of permissions provides a basis upon which the client device can access the requested service, the set of permissions being based on market segment information included in the mediated communication; and executing instructions stored in memory of the trading server, wherein execution of the instructions by a processor of the trading server:

identifies a user account associated with the mediated communication, and assigns the supplemental content to the identified user account, wherein the assigned supplemental content is available to the user account for use during play of the content title.

2. The method of claim 1, further comprising sending a report from the trading server to a reporting server regarding activity associated with the assignment of the supplemental content, the report being generated in accordance with the at least one token.

3. The method of claim 1, wherein the assignment of the supplemental content to the user account further includes a transfer of virtual or real money from the user account to an account of an entity offering the supplemental content.

4. The method of claim 3, wherein the transfer of virtual or real money from the user account to the account of the entity offering the supplement content includes an intermediate transfer of the virtual or real money to an escrow account.

5. The method of claim 3, wherein the supplemental content is generated by the entity offering the supplement content, the entity being another user of the content title.

6. The method of claim 3, wherein the supplemental content was found by the entity during play of the content title.

7. The method of claim 1, wherein the supplemental content is hosted in a marketplace of content available for trading, the supplemental content being listed in the marketplace by an entity offering the supplemental content.

8. The method of claim 1, further comprising creating a user account associated with the trading server, the user account based on information provided in the mediated communication sent by the client device.

9. The method of claim 8, wherein the user account is further associated with a game server, the game server providing a service related to play of the content title played on the client device.

10. The method of claim 8, wherein the user account is further associated with a marketplace server, the marketplace server hosting the supplemental content available for trading.

11. The method of claim 1, wherein the content title is associated with a game server and further comprising transferring information regarding the supplemental content to the game server associated with the content title.

12. A system for managing online trading services associated with digital content, the system comprising:
a mediation server configured to mediate communication from or to a client device, the client device including a memory and a processor for executing instructions stored in memory, configured to play a content title; and
a trading server for:
receiving a mediated communication from the client device, the mediated communication including a request concerning a transfer of supplemental content from a marketplace to the client device and at least one token, the at least one token including configuration information about the client device, the supplemental content being related to the content title and indicated as being available for trading, the mediated communication and the token being used by the mediation server to determine and provide a set of permissions, in which the set of permissions provides a basis upon which the client device can access the requested service, the set of permissions being based on market segment information included in the mediated communication,
identifying a user account associated with the mediated communication, and
assigning the supplemental content to the identified user account, wherein the assigned supplemental content is available to the user account for use during play of the content title via the user account.

13. The system of claim 12, wherein the marketplace of the supplemental content available for trading is hosted by the trading server.

14. The system of claim 13, wherein the reporting server further receives a report from the client device, the report being generated in accordance with the mediation data.

15. The system of claim 12, wherein the marketplace of the supplemental content available for trading is hosted by a marketplace server, wherein access to the marketplace server by the client device is mediated by the mediation server.

16. The system of claim 12, wherein the trading server further sends a report to the reporting server regarding activity associated with the assignment of the supplemental content, the report being generated in accordance with the at least one token.

17. The system of claim 12, further comprising a reporting server configured to receive reports from the client device, the marketplace server, and/or the trading server.

18. The system of claim 17, wherein the reporting server generates a compilation of information for a partner.

19. The system of claim 12, wherein the assignment of the supplemental content to the user account further includes a transfer of virtual or real money from the user account to an account of an entity offering the supplemental content.

20. The system of claim 19, wherein the transfer of virtual or real money from the user account to the entity account comprises an intermediate transfer of the virtual or real money to an escrow account.

21. The system of claim 12, further comprising a game server associated with the content title, wherein the trading server transfers information regarding the supplemental content to the game server.

22. A non-transitory computer-readable storage medium having embodied thereon a program, the program being executable by a processor to perform a method for managing online trading services associated with digital content, the method comprising:
receiving a mediated communication, the mediated communication including a request concerning a transfer of supplemental content related to a content title played on a client device, the client device including a memory and a processor for executing instructions stored in the memory, and at least one token, the at least one token including configuration information about the client device, in which the mediated communication and the token are used by a mediation server to determine and provide a set of permissions, in which the set of permissions provides a basis upon which the client device can access the requested service, the set of permissions being based on market segment information included in the mediated communication;
identifying a user account associated with the mediated communication; and
assigning the supplemental content to the identified user account, wherein the assigned supplemental content is available to the user account for use during play of the content title.

23. The non-transitory computer-readable storage medium of claim 22, further comprising instructions executable to send a report regarding activity associated with the assignment of the supplemental content, the report being generated in accordance with the at least one token.

24. The non-transitory computer-readable storage medium of claim 22, wherein the assignment of the supplemental content to the user account further includes a transfer of virtual or real money from the user account to an account of an entity offering the supplemental content.

25. The non-transitory computer-readable storage medium of claim 22, wherein the supplemental content is hosted in a marketplace of content available for trading, the supplemental content being listed in the marketplace by an entity offering the supplemental content.

* * * * *